United States Patent
Zhu et al.

(10) Patent No.: US 10,915,155 B2
(45) Date of Patent: Feb. 9, 2021

(54) METHOD AND DEVICE FOR CONTROLLING STATE OF TERMINAL

(71) Applicant: BEIJING XIAOMI MOBILE SOFTWARE CO., LTD., Beijing (CN)

(72) Inventors: Kai Zhu, Beijing (CN); Guosheng Li, Beijing (CN); Fuzhi Yu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 352 days.

(21) Appl. No.: 16/012,322

(22) Filed: Jun. 19, 2018

(65) Prior Publication Data

US 2019/0073017 A1 Mar. 7, 2019

(30) Foreign Application Priority Data

Sep. 1, 2017 (CN) .......................... 2017 1 0778396

(51) Int. Cl.
*G06F 1/32* (2019.01)
*G06F 1/3231* (2019.01)
*G06F 1/16* (2006.01)
*G06F 1/3218* (2019.01)
*G06F 1/3206* (2019.01)
*G06F 1/3287* (2019.01)
*H04M 1/725* (2021.01)
*H04M 1/73* (2006.01)

(52) U.S. Cl.
CPC .......... *G06F 1/3231* (2013.01); *G06F 1/1626* (2013.01); *G06F 1/3206* (2013.01); *G06F 1/3218* (2013.01); *G06F 1/3287* (2013.01); *H04M 1/72577* (2013.01); *H04M 1/73* (2013.01); *Y02D 30/70* (2020.08)

(58) Field of Classification Search
CPC .... G06F 1/3231; G06F 1/1626; G06F 1/3206; G06F 1/3218; G06F 1/3287; H04M 1/72577; H04M 1/73
See application file for complete search history.

(56) References Cited

U.S. PATENT DOCUMENTS

2012/0280917 A1 11/2012 Toksvig

FOREIGN PATENT DOCUMENTS

| EP | 3179357 | * | 6/2017 |
| EP | 3179357 A1 | | 6/2017 |

OTHER PUBLICATIONS

European Office Action issued in EP App. No. 18183101.7, dated Feb. 21, 2019, 7 pages.

* cited by examiner

*Primary Examiner* — Lisa S Landis
(74) *Attorney, Agent, or Firm* — Arch & Lake LLP

(57) ABSTRACT

A method and a device are provided for controlling a state of a terminal. The method includes determining a scenario that the terminal is in. The scenario includes a non-use scenario where the terminal is not used. The method further includes deactivating a preset functional module such that the terminal is switched to a non-interactive state when the terminal is in the non-use scenario and the terminal is in an interactive state where the preset functional module is running.

18 Claims, 7 Drawing Sheets

METHOD AND DEVICE FOR CONTROLLING STATE OF TERMINAL

CROSS REFERENCE TO RELATED APPLICATION

This application is based upon and claims a priority to Chinese Patent Application Serial No. 201710778396.6, filed with the State Intellectual Property Office of P. R. China on Sep. 1, 2017, the entire contents of which are incorporated herein by reference.

TECHNICAL FIELD

The present disclosure relates to the field of terminal technology, and more particularly, to a method for controlling a state of a terminal, a device for controlling a state of a terminal, an electronic device and a computer readable storage medium.

BACKGROUND

Currently, terminals like mobile phones will enter a sleep state and deactivate some functions so as to reduce power consumption after their screens are off.

Generally, it is entered the sleep state only in such scenarios when the screen is off. However, in practice, the mobile phone may be in a variety of other scenarios, in which usage situations of the mobile phone by a user are different. For example, in a particular scenario, if some functions are deactivated based on the sleep state, other functions that are unused in the particular scenario are still running, resulting in power waste.

SUMMARY

According to a first aspect of embodiments of the present disclosure, there is provided a method for controlling a state of a terminal. The method includes the followings. A scenario where the terminal is in is determined. The scenario includes a non-use scenario where the terminal is not used. A preset functional module is deactivated such that the terminal is switched from an interactive state to a non-interactive state, when the terminal is in the non-use scenario and the terminal is in the interactive where the preset functional module is running.

According to a second aspect of embodiments of the present disclosure, there is provided an electronic device. The electronic device includes a processor, and a memory configured to store instructions executable by the processor. The processor is configured to determine a scenario where the terminal is in, in which the scenario includes a non-use scenario where the terminal is not used; and to deactivate a preset functional module such that the terminal is switched from an interactive state to a non-interactive state when the terminal is in the non-use scenario and the terminal is in the interactive state where the preset functional module is running.

According to a third aspect of embodiments of the present disclosure, there is provided a computer readable storage medium having computer programs stored thereon. When the computer programs are executed by a processor, following acts are performed. A scenario where the terminal is in is determined, in which the scenario includes a non-use scenario where the terminal is not used; and a preset functional module is deactivated such that the terminal is switched from an interactive state to a non-interactive state when the terminal is in the non-use scenario and the terminal is in the interactive state where the preset functional module is running.

It is to be understood that, both the foregoing general description and the following detailed description are exemplary and explanatory only and are not restrictive of the present disclosure.

BRIEF DESCRIPTION OF THE DRAWINGS

The accompanying drawings herein are incorporated in and become parts of the specification, illustrate embodiments consistent with the present disclosure and, together with the description, serve to explain the principles of the present disclosure.

DETAILED DESCRIPTION

Descriptions will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
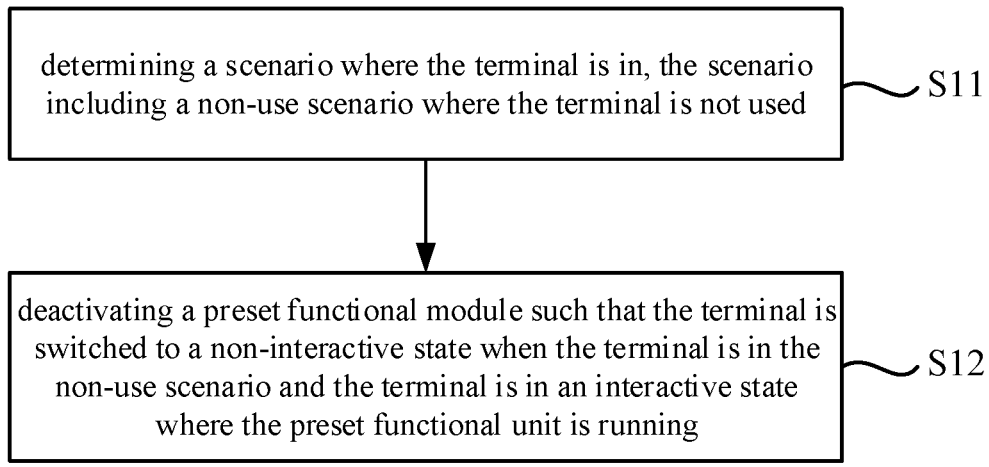
FIG. 1 is a flow chart illustrating a method for controlling a state of a terminal according to an aspect of the present disclosure.

FIG. 1 a flow chart illustrating a method for controlling a state of a terminal according to an aspect of the present disclosure. The method according to embodiments may be applicable to a terminal, such as an electronic device (for example a mobile phone, a tablet computer and the like). As illustrated in FIG. 1, the method may include the followings.

In block S11, a scenario where the terminal is in is determined. The scenario includes a non-use scenario where the terminal is not used.

In one or more embodiments, the terminal being not used means that a probability of using the terminal is relatively low. For example, the probability of using the terminal may be less than a preset probability. The preset probability may be set according to requirements. For example, the preset probability may be set to be 1%.

The preset probability may be obtained by performing statistic on probabilities that terminals are used by a large number of users in the non-use scenario.

In one or more embodiments, taking the mobile phone as an example, the non-use scenario may be a scenario where the terminal is reversed or a scenario where the terminal is located in a pocket. In these scenarios, some functional modules of the mobile terminal may not be used by a user, such as a fingerprint recognition circuitry, a face recognition circuitry and the like. When the user desires to use these functional modules, the mobile terminal may generally escape from the above scenarios. For example, the mobile phone may be turned over or the mobile phone may be brought out of the pocket.

In this disclosure, in addition to those above scenarios including the terminal being reversed and the terminal being located in the pocket, the non-use scenario may be that the mobile is hold by a user when the user is running, or that the terminal is hold when the user is driving.

In block S12, a preset functional module is deactivated, such that the terminal is switched from an interactive state to a non-interactive state when the terminal is in the non-use scenario and the terminal is in the interactive state where the preset functional module is running.

In one or more embodiments, the preset functional module may be associated to the non-use scenario and labelled in advance. When the terminal is in the non-use scenario, the preset functional module may be almost not used by the user. Therefore, deactivating the present functional module may reduce power consumption generated by the present functional module in the non-use scenario without interfering with a usage of the terminal (for example, the user is listening via Bluetooth earphones songs or call-in prompt sounds played by the terminal).

Taking the fingerprint recognition circuitry as an example, in related arts, when the terminal is reversed or the terminal is located in the pocket, the terminal still keeps the fingerprint recognition circuitry working, to guarantee a continuous recognition of fingerprints input by the user so as to awake the terminal. By contrast, in embodiments of the present disclosure, when it is determined that the terminal is in the non-use scenario, it may be determined that the terminal may not be operated by the user, and thus the fingerprint recognition circuitry may be not used by the user. Therefore, the fingerprint recognition circuitry may be deactivated, thereby avoiding generating power consumption by the fingerprint recognition circuitry in the non-use scenario, to reduce overall power consumption of the terminal in the non-use scenario and improve a work period of the terminal.

In this disclosure, embodiments may be applicable to a situation where a display module (such as a screen) of the terminal is not brightened, or may be applicable to a situation where the display module of the terminal is brightened.

Figure 2:
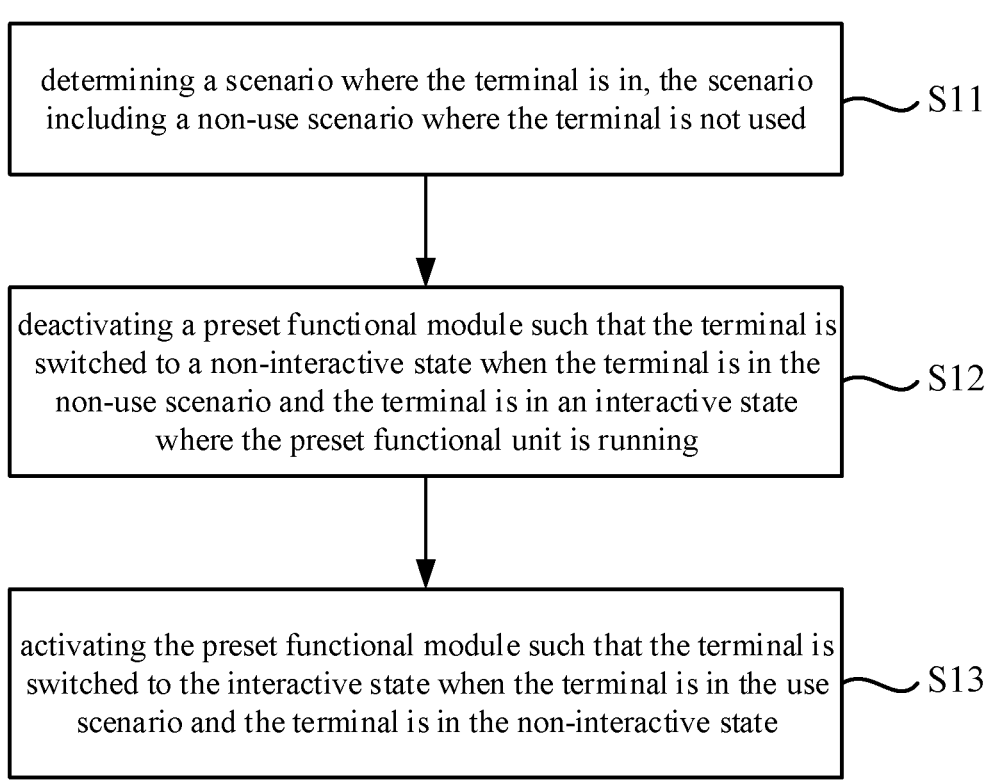
FIG. 2 is a flow chart illustrating another method for controlling a state of a terminal according to an aspect of the present disclosure.

FIG. 2 is a flow chart illustrating another method for controlling a state of a terminal according to an aspect of the present disclosure. As illustrated in FIG. 2, the scenario includes a use scenario where the terminal is used. The method further includes the followings.

In block S13, the preset functional module is activated, such that the terminal is switched to the interactive state when the terminal is in the use scenario and the terminal is in the non-interactive state.

In one or more embodiments, after the preset functional module is deactivated, it may be monitored whether the terminal escapes from the non-use scenario, i.e., whether the terminal is in the use scenario.

For example, when an object located from the terminal with a distance less than a preset distance exists, and a brightness of ambient light of the terminal is greater than a preset brightness, it may be determined that the terminal escapes from the non-use scenario and enters the use scenario. That is, a probability that the terminal is used by the user is relatively high, and thus the preset functional module already deactivated is activated, such that the terminal is switched to the interactive state, thereby guaranteeing that the terminal may be normally used by the user.

Alternatively or additionally, the non-use scenario includes a scenario where the terminal is reversed or a scenario where the terminal is located in a pocket.

In one or more embodiments, the scenario where the terminal is reversed may refer to a situation where an orientation of a display module of the terminal is located towards a terminal-supporting surface. The scenario where the terminal is located in the pocket may refer to a situation where the terminal is located in a small, narrow and closed space, such as a trouser pocket, a coat pocket, a bag or the like.

In one or more embodiments, it may be determined whether the terminal is reversed or whether the terminal is located in the pocket according to whether the object located from the terminal with the distance less than the preset distance exists or whether the brightness of ambient light of the terminal is less than the preset brightness.

In one or more embodiments, a distance sensor such as an infrared distance sensor may be arranged in the terminal, which may be configured to determine whether the object located from the terminal with the distance less than the preset distance exists. The distance sensor may be arranged in the same side with the display module, such that the distance sensor may determine whether the body located from the display module with the distance less than the preset distance exists.

In one or more embodiments, an ambient light sensor may be arranged in the terminal, which may be configured to detect whether the brightness of ambient light of the terminal is less than the preset brightness. The ambient light sensor may be arranged at the same side with the display module. Such that the ambient light sensor is mainly configured to detect ambient light at the side of the display module.

When the object located from the terminal with the distance less than the preset distance exists, and the brightness of ambient light is less than the preset brightness, it may be determined that the object is closer to the terminal, and the object may shelter the ambient light or the terminal is located in dim. Based on the above two conditions, as well as practical situations where the terminal is used in daily life, it may be determined that the terminal is either reversed (for example the orientation of a screen of the terminal is located towards to a desk) or located in the pocket (for example the terminal is located in a coat pocket, or in a bag).

Figure 3:
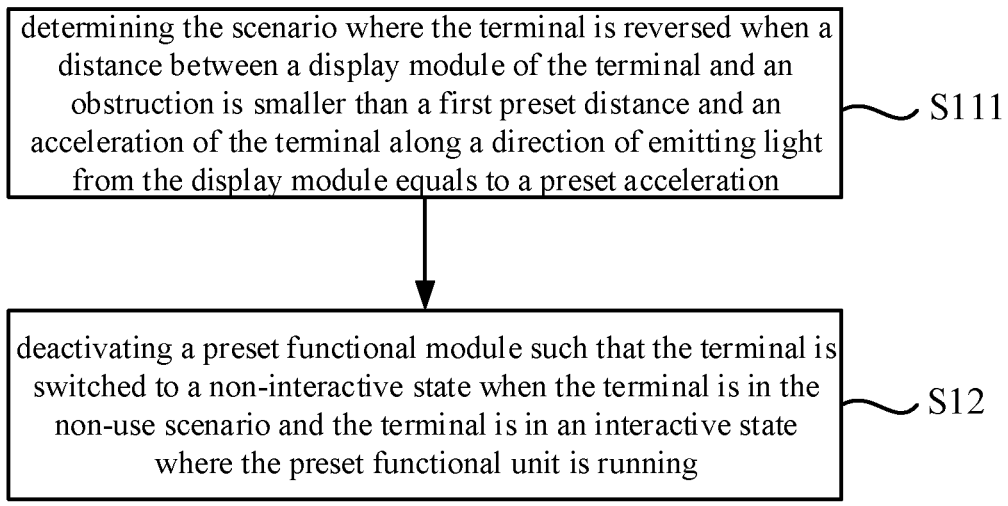
FIG. 3 is a flow chart illustrating still another method for controlling a state of a terminal according to an aspect of the present disclosure.

FIG. 3 is a flow chart illustrating still another method for controlling a state of a terminal according to an aspect of the present disclosure. As illustrated in FIG. 3, determining the scenario where the terminal is reversed includes the followings.

In block S111, when it is determined that a distance between a display module of the terminal and an obstruction is less than a first preset distance, and an acceleration of the terminal along a direction of emitting light from the display module equals to a preset acceleration, it is determined the scenario where the terminal is reversed.

In one or more embodiments, a distance sensor and an acceleration sensor may be arranged in the terminal. The distance sensor may be arranged in the same side with the display module, configured to sense a distance between the obstruction in front of the display module and the display module. The acceleration sensor may be configured to sense accelerations of the terminal in various directions.

When the distance between the display module of the terminal and the obstruction is less than the first preset distance and the acceleration of the terminal along a direction of emitting light from the display module equals to the preset acceleration, it may be determined that the terminal is reversely located on a bed, a desk or the like according to practical situations where the terminal is used by the user in daily life, i.e., the situation where the terminal is reversed is determined. The first preset distance may be set according to requirements, for example the first preset distance may be set to be 0.1 millimeter. The preset acceleration may be equal to a gravitational acceleration, and may be adjusted according to altitude of the terminal.

Figure 4:
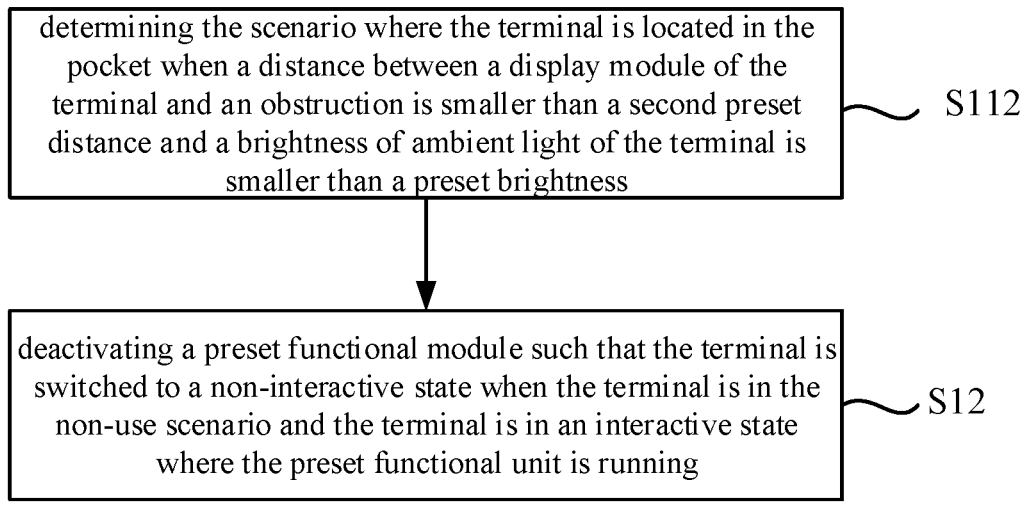
FIG. 4 is a flow chart illustrating yet another method for controlling a state of a terminal according to an aspect of the present disclosure.

FIG. 4 is a flow chart illustrating yet another method for controlling a state of a terminal according to an aspect of the present disclosure. As illustrated in FIG. 4, determining the scenario where the terminal is located in the pocket includes the followings.

In block S112, when it is determined that the distance between the display module and the obstruction is less than a second preset distance, and a brightness of ambient light of the terminal is less than a preset brightness, it is determined the scenario where the terminal is located in the pocket.

In one or more embodiments, the distance sensor and an ambient light sensor may be arranged in the terminal. The distance sensor may be arranged in the same side with the display module, configured to sense the distance between the obstruction in front of the display module and the display module. The ambient light sensor is configured to sense the brightness of ambient light of the terminal.

When the distance between the display module of the terminal and the obstruction is less than the second preset distance, and the brightness of ambient light of the terminal is less than the preset brightness, it may be determined that the terminal is located in the pocket or in the bag according to practical situations where the terminal is used by the user in daily life, i.e., the scenario where the terminal is located in the pocket is determined. The second preset distance may be set according to requirements, for example the second preset distance may be set to be 1 centimeter. The preset brightness may be set according to requirements, for example the preset brightness may be set to be 5 lux.

Alternatively or additionally, the preset functional module includes one or more of a light prompt circuitry, a fingerprint recognition circuitry, a touch sensing circuitry, an eye recognition circuitry and a face recognition circuitry.

In one or more embodiments, the light prompt circuitry may be a LED (Light Emitting Diode) light arranged above the display module of the terminal, configured to prompt that a new message is received. The fingerprint recognition circuitry may be configured to recognize fingerprints input by the user to awake the terminal. The touch sensing circuitry may be configured to sense touch operations of the user. The eye recognition circuitry may be configured to recognize irises of the user. The face recognition circuitry may be configured to recognize faces.

The above five functional modules are generally not used when the terminal is in the non-use scenario. Therefore, when the terminal is in the non-use scenario, if one or more of the five above functional modules are running, running functional modules may be disabled, to avoid generation of power consumption by running functional modules.

In the disclosure, the preset functional modules may be selected according to requirements and not limited to the above five functional modules.

Figure 5:
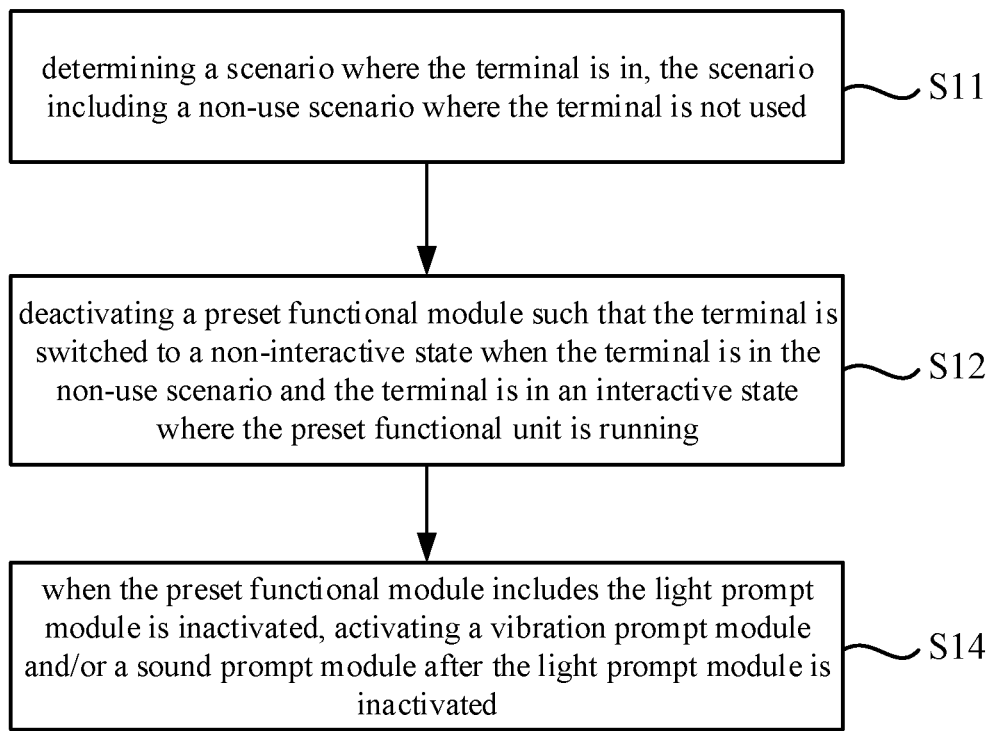
FIG. 5 is a flow chart illustrating yet another method for controlling a state of a terminal according to an aspect of the present disclosure.

FIG. 5 is a flow chart illustrating yet another method for controlling a state of a terminal according to an aspect of the present disclosure. As illustrated in FIG. 5, when the preset functional module includes the light prompt circuitry, the method further includes the followings after the light prompt circuitry is deactivated.

In block S14, a vibration prompt circuitry of the terminal is activated and/or a sound prompt circuitry of the terminal is activated.

In one or more embodiments, when the terminal is in the non-interactive state, in order to avoid generating unnecessary power consumption due to no seen of lights emitted by the light prompt circuitry, the light prompt circuitry may be deactivated. Although this can avoid the unnecessary power consumption, the user is unable to receive prompt information.

Based on the above, In one or more embodiments, after the light prompt circuitry is deactivated, the vibration prompt circuitry is activated and/or the sound prompt circuitry is activated, thereby triggering the vibration prompt circuitry and/or the sound prompt circuitry to work when a message needing to be prompted with the light prompt circuitry is received. For example, the vibration prompt circuitry may be triggered to vibrate or the sound prompt circuitry may be triggered to make a sound, such that the user may timely receive the prompt information, and see the message received.

Figure 6:
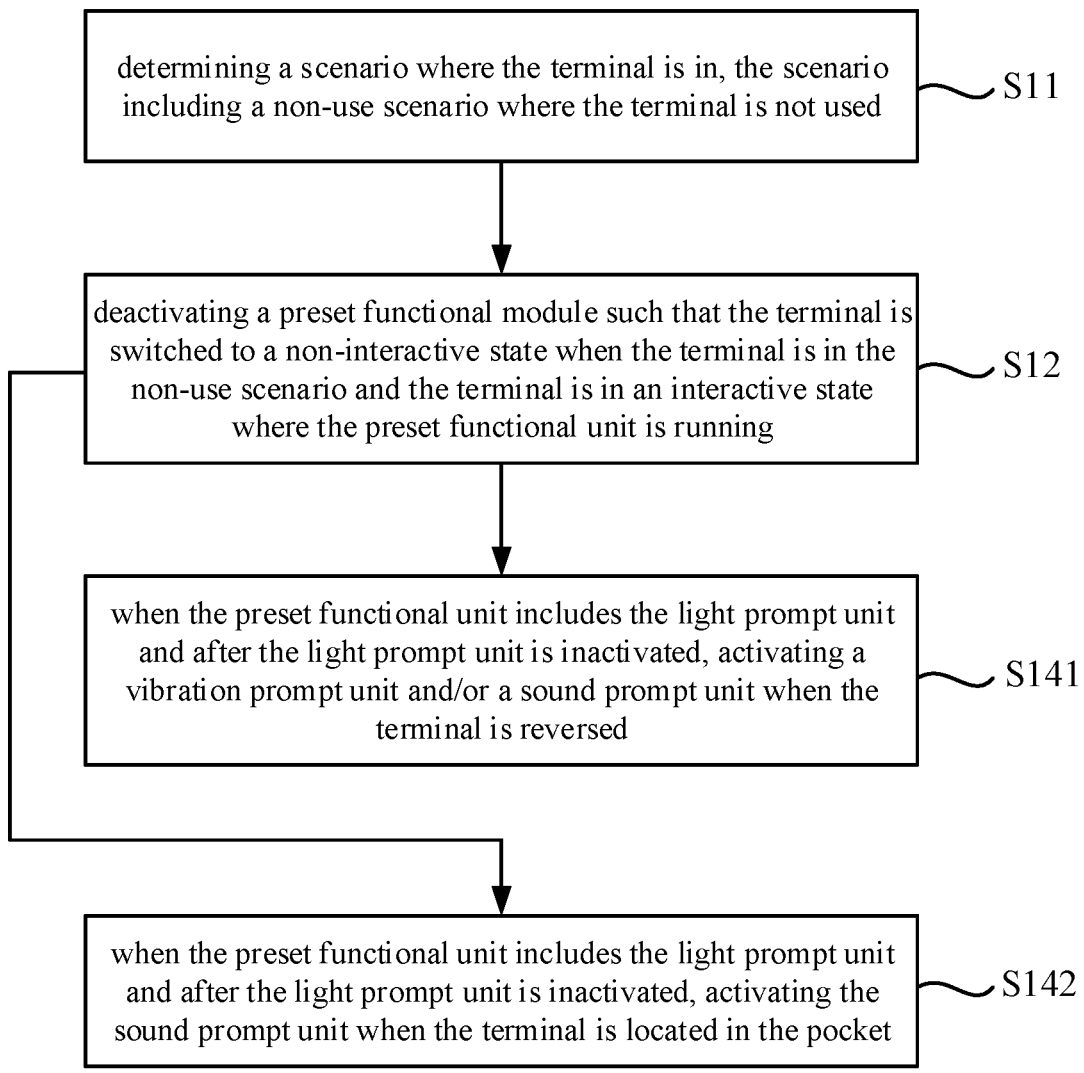
FIG. 6 is a flow chart illustrating yet another method for controlling a state of a terminal according to an aspect of the present disclosure.

FIG. 6 is a flow chart illustrating yet another method for controlling a state of a terminal according to an aspect of the present disclosure. As illustrated in FIG. 6, activating the vibration prompt circuitry and/or the sound prompt circuitry may include the followings.

In block S141, when the terminal is reversed, the vibration prompt circuitry is activated and/or the sound prompt circuitry is activated.

In block S142, when the terminal is located in the pocket, the sound prompt circuitry is activated.

In one or more embodiments, when the terminal is reversed, the user may receive the prompt information with a vibration prompt or a sound prompt. Therefore, prompting the user may be achieved by activating the vibration prompt circuitry and/or the sound prompt circuitry. When the terminal is located in the pocket, it is difficult to be felt by the user with the vibration prompt. Therefore, only the sound prompt circuitry is activated to make sounds to prompt the user, thereby avoiding power consumption of the vibration prompt circuitry.

Corresponding to the method for controlling a state of a terminal described above, embodiments of the present disclosure further provide a device for controlling a state of a terminal.

Figure 7:
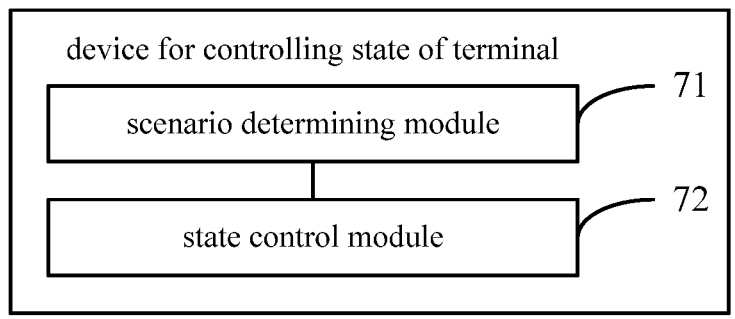
FIG. 7 is a block diagram illustrating a device for controlling a state of a terminal according to an aspect of the present disclosure.

FIG. 7 is a block diagram illustrating a device for controlling a state of a terminal according to an aspect of the present disclosure. As illustrated in FIG. 7, the device includes a scenario determining module 71 and a state control module 72.

The scenario determining module 71 is configured to determine a scenario where the terminal is in. The scenario includes a non-use scenario where the terminal is not used.

The state control module 72 is configured to deactivate a preset functional module such that the terminal is switched to a non-interactive state when the terminal is in the non-use scenario and the terminal is in an interactive state where the preset functional module is running.

Alternatively or additionally, the scenario further includes a use scenario where the terminal is used. The state control module is further configured to activate the preset functional module such that the terminal is switched to the interactive state when the terminal is in the use scenario and the terminal is in the non-interactive state.

Alternatively or additionally, the non-use scenario includes a scenario where the terminal is reversed or a scenario where the terminal is located in a pocket.

Figure 8:
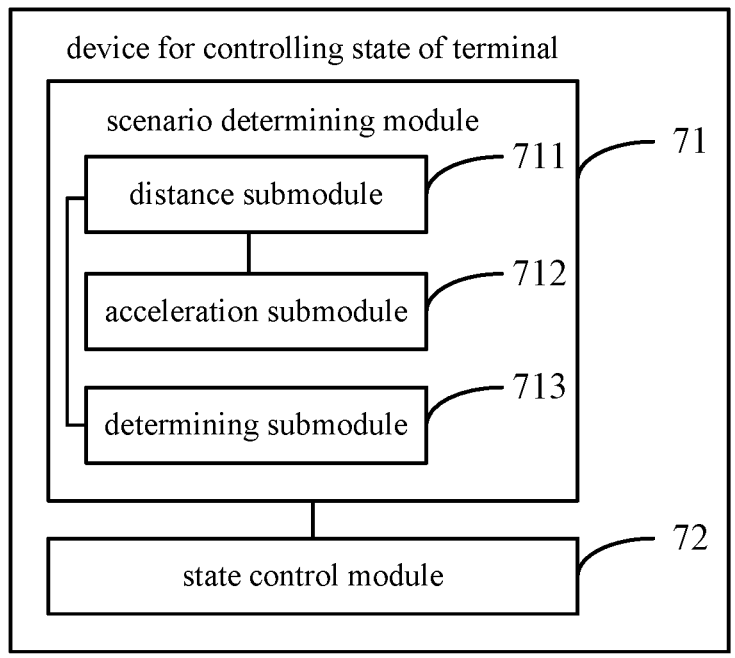
FIG. 8 is a block diagram illustrating another device for controlling a state of a terminal according to an aspect of the present disclosure.

FIG. 8 is a block diagram illustrating another device for controlling a state of a terminal according to an aspect of the present disclosure. As illustrated in FIG. 8, the scenario determining module 71 includes a distance submodule 711, an acceleration submodule 712 and a determining submodule 713.

The distance submodule 711 is configured to determine a distance between a display module of the terminal and an obstruction.

The acceleration submodule 712 is configured to determine an acceleration of the terminal along a direction of emitting light from the display module.

The determining submodule 713 is configured to determine the scenario where the terminal is reversed when the distance is smaller than a first preset distance and the acceleration equals to a preset acceleration.

Figure 9:
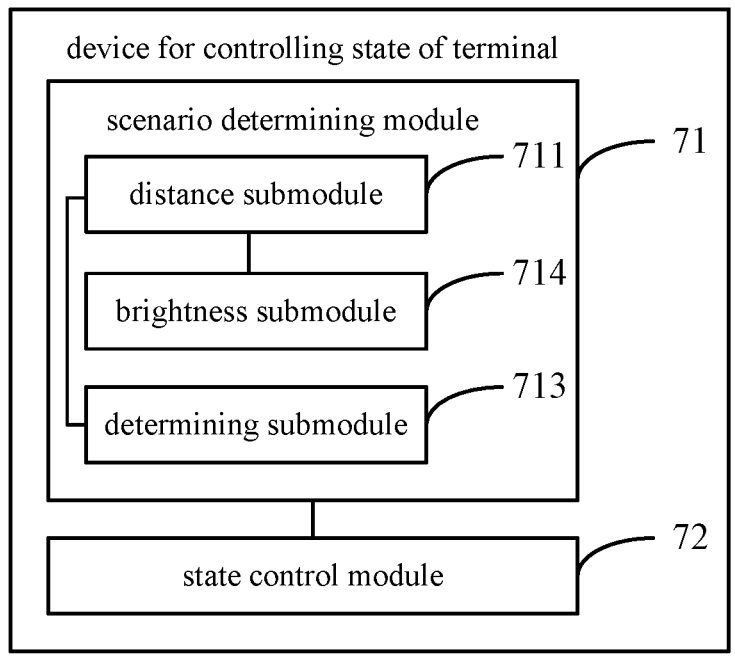
FIG. 9 is a block diagram illustrating still another device for controlling a state of a terminal according to an aspect of the present disclosure.

FIG. 9 is a block diagram illustrating still another device for controlling a state of a terminal according to an aspect of the present disclosure. As illustrated in FIG. 9, the scenario determining module 71 includes a distance submodule 711, a brightness submodule 714 and a determining submodule 713.

The distance submodule 711 is configured to determine a distance between a display module of the terminal and an obstruction.

The brightness submodule 714 is configured to determine a brightness of ambient light of the terminal.

The determining submodule 713 is configured to determine the scenario where the terminal is located in the pocket when the distance is smaller than a second preset distance and the brightness is smaller than a preset brightness.

Alternatively or additionally, the preset functional module includes one or more of a light prompt circuitry, a fingerprint recognition circuitry, a touch sensing circuitry, an eye recognition circuitry and a face recognition circuitry.

Figure 10:
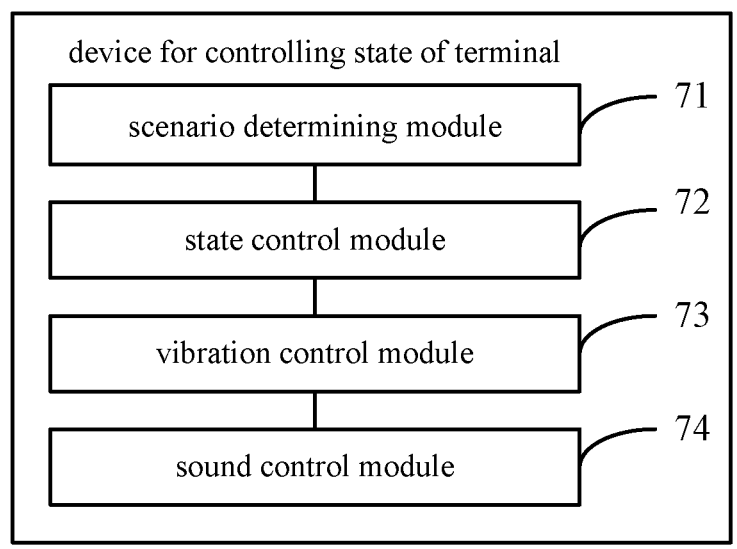
FIG. 10 is a block diagram illustrating yet another device for controlling a state of a terminal according to an aspect of the present disclosure.

FIG. 10 is a block diagram illustrating yet another device for controlling a state of a terminal according to an aspect of the present disclosure. As illustrated in FIG. 10, the device further includes a vibration control module 73 and/or a sound control module 74.

The vibration control module 73 is configured to activate a vibration prompt circuitry after the light prompt circuitry is deactivated.

The sound control module 74 is configured to activate a sound prompt circuitry after the light prompt circuitry is deactivated.

Alternatively or additionally, the vibration control module 73 is configured to activate the vibration prompt circuitry when the terminal is reversed, and/or the sound control module 74 is configured to activate the sound prompt circuitry when the terminal is reversed.

The sound control module 74 is configured to activate the sound prompt circuitry when the terminal is located in the pocket.

Detailed implementations of functions and actions of above modules in the above devices may be referred to those implementations of blocks in above methods, which are not elaborated herein.

For the device embodiment, related portions may be referred to the method embodiments as the method embodiments correspond to the method embodiments. Those descriptions made to the device embodiments are merely illustrative. The modules described as separated parts may be or may not be physically separated. The parts displayed as modules may be or may not be physical modules. That is, the parts may be at a same position or may be distributed to a plurality of grid modules. A part of or all of them may be selected according to actual demands to realize the technical solution of the present disclosure. The method and the device may be implemented by those skilled in the art without any creative labors.

Embodiments of the present disclosure further provide an electronic device. The electronic device includes a processor, and a memory configured to store instructions executable by the processor. The processor is configured to determine a scenario where the terminal is in. The scenario includes a non-use scenario where the terminal is not used. Furthermore, the processor is configured to deactivate a preset functional module such that the terminal is switched to a non-interactive state when the terminal is in the non-use scenario and the terminal is in an interactive state where the preset functional module is running.

Embodiments of the present disclosure further provide a computer readable storage medium, having computer programs stored thereon. When the computer programs are executed by a processor, followings are executed.

A scenario where the terminal is in is determined. The scenario includes a non-use scenario where the terminal is not used. A preset functional module is deactivated such that the terminal is switched to a non-interactive state when the terminal is in the non-use scenario and the terminal is in an interactive state where the preset functional module is running.

Figure 11:
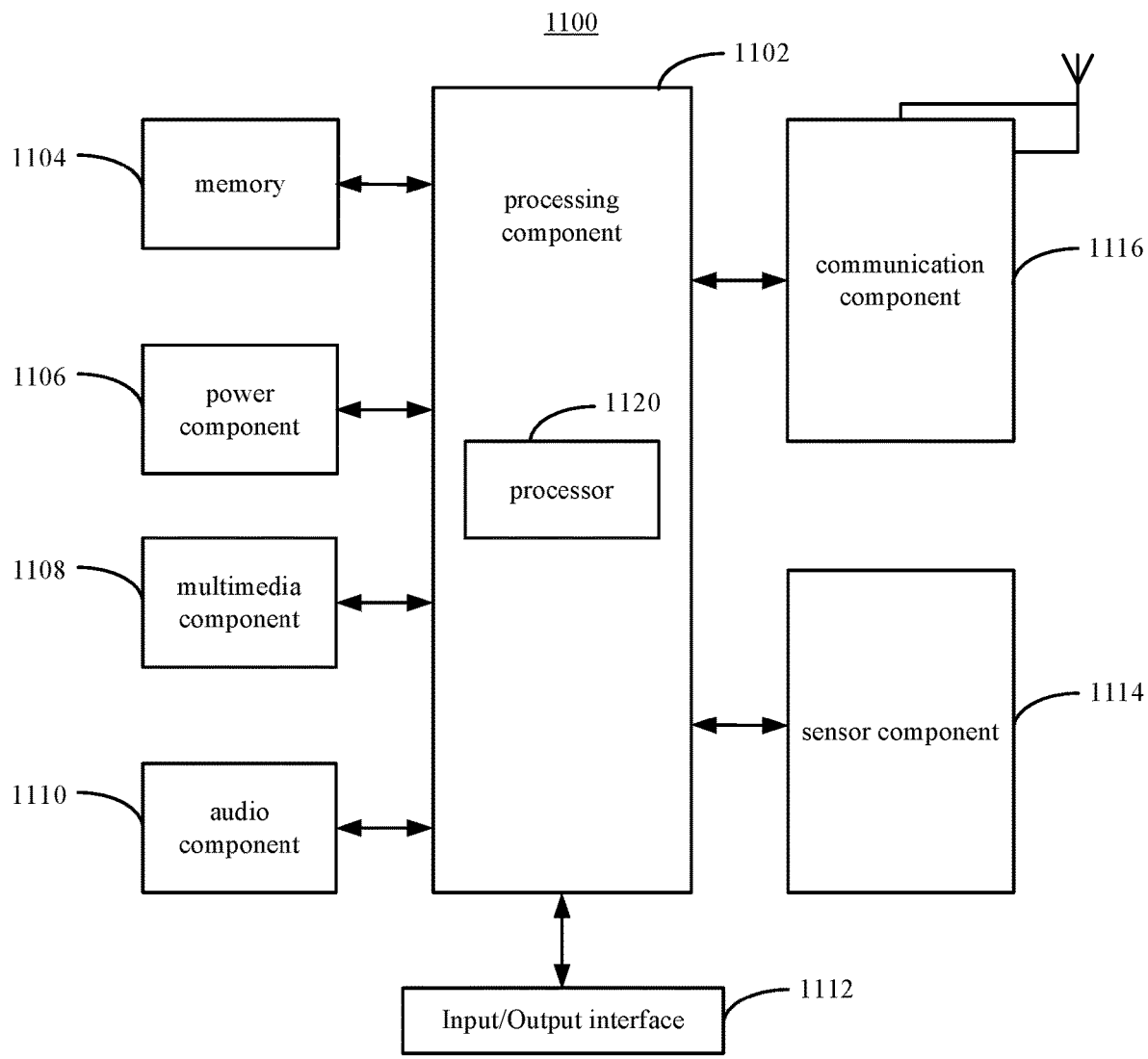
FIG. 11 is a block diagram illustrating an apparatus for controlling a terminal according to an aspect of the present disclosure.

FIG. 11 is a block diagram illustrating an apparatus 1100 for controlling a terminal according to an aspect of the present disclosure. For example, the apparatus 1100 may be a mobile terminal, a computer, a digital broadcasting terminal, a messaging device, a game console, a tablet device, a medical device, fitness equipment, a personal digital assistant, and the like.

Referring to FIG. 11, the apparatus 1100 may include the following one or more components: a processing component 1102, a memory 1104, a power component 1106, a multimedia component 1108, an audio component 1110, an Input/Output (I/O) interface 1112, a sensor component 1114, and a communication component 1116.

The processing component 1102 typically controls overall operations of the apparatus 1100, such as the operations associated with display, telephone calls, data communications, camera operations, and recording operations. The processing component 1102 may include one or more processors 1120 to execute instructions to perform all or part of the acts in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the apparatus 1100. Examples of such data include instructions for any applications or methods operated on the apparatus 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the apparatus 1100. The power component 1106 may include a power management system, one or more power sources, and any other components associated with the generation, management, and distribution of power in the apparatus 1100.

The multimedia component 1108 includes a screen providing an output interface between the apparatus 1100 and the user. In some embodiments, the screen may include a liquid crystal display (LCD) and a press panel (TP). If the screen includes the touchable panel, the screen may be implemented as a touch screen to receive input signals from the user. The touchable panel includes one or more touch sensors to sense touches, swipes, and other gestures on the touchable panel. The touch sensors may not only sense a boundary of a touch or swipe action, but also sense a duration time and a pressure associated with the touch or swipe action. In some embodiments, the multimedia component 1108 includes a front camera and/or a rear camera. The front camera and/or the rear camera may receive external multimedia data while the apparatus 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone (MIC) configured to receive an external audio signal when the apparatus 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface for the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the apparatus 1100. For instance, the sensor component 1114 may detect an open/closed status of the apparatus 1100 and relative positioning of components (e.g. the display and the keypad of the apparatus 1100). The sensor component 1114 may also detect a change in position of the apparatus 1100 or of a component in the apparatus 1100, a presence or absence of user contact with the apparatus 1100, an orientation or an acceleration/deceleration of the apparatus 1100, and a change in temperature of the apparatus 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, a microwave sensor or a temperature sensor.

The communication component 1116 is configured to facilitate wired or wireless communication between the apparatus 1100 and other apparatuses. The apparatus 1100 can access a wireless network based on a communication standard, such as WIFI, 2G, or 3G, or a combination thereof. In one aspect, the communication component 1116 receives a broadcast signal or broadcast associated information from an external broadcast management system via a broadcast channel. In one aspect, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more exemplary embodiments, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method In one or more exemplary embodiments, there is also provided a non-transitory computer readable storage medium having instructions, such as the memory 1104 including instructions. The instructions may be executed by the processors 1120 of the apparatus 1100 to perform the above method. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It is to be understood that, the present disclosure is not limited to the exact construction that has been described above and illustrated in the accompanying drawings, and that various modifications and changes can be made without

What is claimed is:

1. A method for controlling a state of a terminal, comprising:
   determining a scenario where the terminal is in, wherein the scenario comprises a non-use scenario where the terminal is not used;
   deactivating a light prompt circuitry for emitting light to perform a prompt operation such that the terminal is switched from an interactive state to a non-interactive state when the terminal is in the non-use scenario and the terminal is in the interactive state; and
   activating a vibration prompt circuitry and/or a sound prompt circuitry to trigger to vibrate or make a sound after the light prompt circuitry is deactivated to avoid generating unnecessary power consumption.

2. The method according to claim 1, wherein the scenario further comprises a use scenario where the terminal is used, and the method further comprises:
   activating the light prompt circuitry such that the terminal is switched to the interactive state when the terminal is in the use scenario and the terminal is in the non-interactive state.

3. The method according to claim 1, wherein the non-use scenario comprises a scenario where the terminal is reversed or a scenario where the terminal is located in a pocket.

4. The method according to claim 3, wherein determining the scenario where the terminal is reversed comprises:
   determining the scenario where the terminal is reversed when a distance between a display of the terminal and an obstruction is smaller than a first preset distance and an acceleration of the terminal along a direction of emitting light from the display equals to a preset acceleration.

5. The method according to claim 3, wherein determining the scenario where the terminal is located in the pocket comprises:
   determining the scenario where the terminal is located in the pocket when a distance between a display of the terminal and an obstruction is smaller than a second preset distance and a brightness of ambient light of the terminal is smaller than a preset brightness.

6. The method according to claim 1, further comprising:
   deactivating one or more of following circuitries:
   the light prompt circuitry;
   a fingerprint recognition circuitry;
   a touch sensing circuitry;
   an eye recognition circuitry; and
   a face recognition circuitry.

7. The method according to claim 1, wherein activating the vibration prompt circuitry and/or the sound prompt circuitry of the terminal comprises:
   activating the vibration prompt circuitry and/or the sound prompt circuitry when the terminal is reversed; and
   activating the sound prompt circuitry when determining that the terminal is located in a pocket.

8. An electronic device, comprising:
   a processor;
   a memory, configured to store instructions executable by the processor;
   wherein the processor is configured to:
   determine a scenario where the electronic device is in, wherein the scenario comprises a non-use scenario where the electronic device is not used;
   deactivate a light prompt circuitry for emitting light to perform a prompt operation such that the electronic device is switched from an interactive state to a non-interactive state when the electronic device is in the non-use scenario and the electronic device is in the interactive state; and
   activate a vibration prompt circuitry and/or a sound prompt circuitry to trigger to vibrate or make a sound after the light prompt circuitry is deactivated to avoid generating unnecessary power consumption.

9. The electronic device according to claim 8, wherein the scenario further comprises a use scenario where the electronic device is used, and the processor is further configured to:
   activate the light prompt circuitry such that the electronic device is switched to the interactive state when the electronic device is in the use scenario and the electronic device is in the non-interactive state.

10. The electronic device according to claim 8, wherein the non-use scenario comprises a scenario where the electronic device is reversed or a scenario where the electronic device is located in a pocket.

11. The electronic device according to claim 10, wherein the processor is configured to determine the scenario where the electronic device is reversed by acts of:
    determining the scenario where the electronic device is reversed when a distance between a display of the electronic device and an obstruction is smaller than a first preset distance and an acceleration of the electronic device along a direction of emitting light from the display equals to a preset acceleration.

12. The electronic device according to claim 10, wherein the processor is configured to determine the scenario where the electronic device is located in the pocket by acts of:
    determining the scenario where the electronic device is located in the pocket when a distance between a display of the electronic device and an obstruction is smaller than a second preset distance and a brightness of ambient light of the electronic device is smaller than a preset brightness.

13. The electronic device according to claim 8, wherein the processor is further configured to:
    deactivate one or more of:
    the light prompt circuitry;
    a fingerprint recognition circuitry;
    a touch sensing circuitry;
    an eye recognition circuitry; and
    a face recognition circuitry.

14. The electronic device according to claim 8, wherein the processor is configured to activate the vibration prompt circuitry and/or the sound prompt circuitry by acts of:
    activating the vibration prompt circuitry and/or the sound prompt circuitry when the electronic device is reversed; and
    activating the sound prompt circuitry when determining that the electronic device is located in a pocket.

15. A non-transitory computer readable storage medium in a terminal, having computer programs stored thereon, wherein when the computer programs are executed by a processor, following acts are performed:
    determining a scenario where the terminal is in, wherein the scenario comprises a non-use scenario where the terminal is not used;
    deactivating a light prompt circuitry for emitting light to perform a prompt operation such that the terminal is switched from an interactive state to a non-interactive state when the terminal is in the non-use scenario and the terminal is in the interactive state; and activating a vibration prompt circuitry and/or a sound prompt circuitry to trigger to vibrate or make a sound after the light prompt circuitry is deactivated to avoid generating unnecessary power consumption.

16. The non-transitory computer readable storage medium according to claim 15, wherein the scenario further comprises a use scenario where the terminal is used, and the processor is further configured to:

activate the light prompt circuitry such that the terminal is switched to the interactive state when the terminal is in the use scenario and the terminal is in the non-interactive state.

17. The non-transitory computer readable storage medium according to claim 15, wherein the non-use scenario comprises a scenario where the terminal is reversed or a scenario where the terminal is located in a pocket.

18. The non-transitory computer readable storage medium according to claim 15, wherein the processor is further configured to:

deactivate one or more of:
the light prompt circuitry;
a fingerprint recognition circuitry;
a touch sensing circuitry;
an eye recognition circuitry; and
a face recognition circuitry.

* * * * *